US011893256B2

(12) United States Patent
Mulholland et al.

(10) Patent No.: US 11,893,256 B2
(45) Date of Patent: Feb. 6, 2024

(54) PARTITIONING OF DEDUPLICATION DOMAINS IN STORAGE SYSTEMS

(71) Applicant: International Business Machines Corporation, Armonk, NY (US)

(72) Inventors: Miles Mulholland, Hampshire (GB); Alex Dicks, Winchester (GB); Dominic Tomkins, Hook (GB); Eric John Bartlett, Chard (GB)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 16/816,089

(22) Filed: Mar. 11, 2020

(65) Prior Publication Data

US 2021/0286534 A1  Sep. 16, 2021

(51) Int. Cl.
*G06F 3/06* (2006.01)
*G06F 16/27* (2019.01)
*G06F 16/901* (2019.01)

(52) U.S. Cl.
CPC .......... *G06F 3/0641* (2013.01); *G06F 3/0604* (2013.01); *G06F 3/067* (2013.01); *G06F 3/0647* (2013.01); *G06F 16/278* (2019.01); *G06F 16/9024* (2019.01)

(58) Field of Classification Search
CPC .... G06F 3/0641; G06F 3/0604; G06F 3/0647; G06F 3/067; G06F 16/278; G06F 16/9024
See application file for complete search history.

(56) References Cited

U.S. PATENT DOCUMENTS

| | | | |
|---|---|---|---|
| 9,195,673 B2 | 11/2015 | Constantinescu et al. | |
| 9,984,092 B1* | 5/2018 | Harnik | G06F 16/1748 |
| 2013/0013567 A1* | 1/2013 | Constantinescu | G06F 16/113 |
| | | | 707/667 |
| 2013/0018854 A1 | 1/2013 | Condict | |
| 2013/0018855 A1* | 1/2013 | Eshghi | G06F 11/1453 |
| | | | 707/E17.002 |
| 2013/0282673 A1* | 10/2013 | Fiske | G06F 16/2365 |
| | | | 707/692 |
| 2014/0279927 A1 | 9/2014 | Constantinescu et al. | |
| 2014/0359244 A1* | 12/2014 | Chambliss | G06F 3/0647 |
| | | | 711/170 |
| 2016/0085807 A1 | 3/2016 | Karanam et al. | |
| 2016/0239581 A1* | 8/2016 | Jaidka | G06F 16/345 |
| 2017/0351698 A1 | 12/2017 | Ioannou et al. | |
| 2018/0039423 A1* | 2/2018 | Yoshii | G06F 12/00 |
| 2019/0362263 A1* | 11/2019 | Harris | G06Q 30/0202 |
| 2020/0065406 A1* | 2/2020 | Ippatapu | G06F 16/9024 |

(Continued)

*Primary Examiner* — Kris E Mackes
*Assistant Examiner* — Tiffany Thuy Bui
(74) *Attorney, Agent, or Firm* — Zilka-Kotab, P.C.

(57) ABSTRACT

Method and system for partitioning of deduplication domains in storage systems. The method includes constructing a data structure having multiple nodes representing data chunks and edges between the nodes representing a weighting of deduplication references between the data chunks, and performing clustering of the nodes of the data structure to split the nodes into clusters of tightly related nodes based on the weightings of the edges. The data chunks represented by a cluster of nodes are migrated to a deduplication domain to restrict deduplication to between only the data chunks in the deduplication domain.

25 Claims, 10 Drawing Sheets

(56) References Cited

U.S. PATENT DOCUMENTS

| | | | |
|---|---|---|---|
| 2020/0117534 A1* | 4/2020 | Yurzola | G06F 3/0619 |
| 2020/0177382 A1* | 6/2020 | Perlman | H04L 9/14 |
| 2021/0004672 A1* | 1/2021 | Glass | G06N 3/045 |
| 2021/0257060 A1* | 8/2021 | Curtis | G16B 40/20 |

* cited by examiner

PARTITIONING OF DEDUPLICATION DOMAINS IN STORAGE SYSTEMS

BACKGROUND

The present invention relates to storage systems, and more specifically, to partitioning of deduplication domains in storage systems.

Thin provisioning is a concept where storage does not wholly allocate the advertised capacity. Storage is only allocated when it must be used. Both block and file systems have equivalents of this: file systems are effectively thin provisioned by their nature as files can only be allocated upon creation; and block storage systems can have thin provisioning implemented using a forward lookup structure to map allocated ranges to the physical storage medium. Storage can either be kept local to a volume or pooled between multiple volumes.

Block storage systems may use storage virtualization providing a method where a number of backend storage systems are connected via a Storage Area Network (SAN) to a storage controller or some other storage appliance providing the forward lookup structure. The backend storage systems may be local to the appliance running the software or maybe connected externally. The backend storage system normally consists of a number of physical drives that are either spinning disk or more commonly flash based storage which are configured in a RAID (Redundant Array of Inexpensive Disks) format.

Thin provisioning in storage systems allows the implementation of advanced space saving techniques, such as compression and deduplication as one need only update the forward lookup structure with the appropriate details.

There is an ever-increasing demand to store more user data with the same physical capacity, this reduces the overall cost of ownership of the storage system. Data deduplication works by identifying repeated data patterns and instead of storing the user data, it will create a reference to the duplicate data that is stored elsewhere in the system. It may be that the existing duplicate is within the same volume, another volume (either in the same pool or another pool within the storage system), or a volume used by another host.

In deduplication, data is broken into standardized units referred to as data chunks that can be examined for duplicates; these chunks may be files or more granular components such as blocks or volumes. Each chunk must be identified in a way that is easily comparable and this is handled by using a parity calculation or cryptographic hash function that gives the chunks shorter identifiers known as hash values, digital signatures, or fingerprints. These signatures are stored in an index where they can be compared quickly with other signatures to find matching chunks.

In known implementations, deduplication operates by having an in-memory lookup table to contain partial hashes of recent writes. An incoming Input/Output (IO) will first perform a hash, using an algorithm like SHA-1 or SHA-256. That hash will then be compared against the lookup table to determine if there may be a match in the system for this IO. If there is a potential match, the potential match is subject to a lookup to determine if the full hash is located in the storage system. If it is, a reference is created for the virtual address and the volume trying to be written to, referencing the potential match's location.

The size of the in-memory lookup table is one of the factors determining whether or not a deduplication reference is found. Increasing the deduplication domain can be performed; however, this requires additional memory.

Another option may be splitting volume-by-volume based on knowledge of the underlying data associated with the volume. This may be feasible for small configurations, but in any large or cloud environment, the administrator may have no knowledge of the underlying data being stored.

SUMMARY

According to an aspect of the present invention there is provided a computer-implemented method for partitioning of deduplication domains in storage systems, comprising: constructing a data structure having multiple nodes representing data chunks and edges between the nodes representing a weighting of deduplication references between the data chunks; performing clustering of the nodes of the data structure to split the nodes into clusters of tightly related nodes based on the weightings of the edges; and migrating the data chunks represented by a cluster of nodes to a deduplication domain to restrict deduplication to between only the data chunks in the deduplication domain.

The method has the advantage of defining clusters of nodes as deduplication domains with strong deduplication references between the nodes in a cluster. This provides improved deduplication ratios as deduplication domains contain similar volumes following migration actions. This improves resource use in the storage of the data and in a deduplication database by providing optimal partitioning of deduplication domains.

Migrating the data chunks may be controlled by a controlling system that has knowledge of the available resources of the storage system. The method may include automatically deciding to split a storage domain according to resource requirements. This automates a process of dividing a storage domain according to knowledge of resource availability and resource requirements, for example, by the controlling system.

The method may include: referencing a deduplication database for each deduplication domain, the deduplication database including references of data chunks in the deduplication domain; and merging two deduplication domains based on a similarity of the deduplication databases. Merging may be used if resources are under-utilized to merge deduplication domains and turn off unneeded resources.

A deduplication domain may be allocated to a core storage controller and the core storage controller may include a deduplication database including references of data chunks in the deduplication domain.

The data structure may be a graph data structure treated as a community structure. Performing clustering of the nodes by clustering techniques may include identifying tightly related data chunks and dropping a minimum number of deduplication references.

Constructing the data structure may include: adding a new node and edge when a new deduplication reference is created with a new data chunk; incrementing edge weightings when a new deduplication reference is created between existing data chunks; and decrementing edge weightings when deduplication reference is removed between existing data chunks.

The method may include: providing a staging area for new data chunks including a reference structure of possible deduplication domains into which a new data chunk may be migrated; carrying out a sampling period for a new data chunk to compare input/output operations for the new data chunk to the reference structure for the deduplication domains; and selecting a deduplication domain for the new data chunk based on a number of hits to the reference structure indicating deduplication references.

According to another aspect of the present invention there is provided a computer-implemented method for partitioning of deduplication domains in storage systems, comprising: providing a staging area for new data chunks including a reference structure of possible deduplication domains into which a new data chunk may be migrated; carrying out a sampling period for a new data chunk to compare input/output operations for the new data chunk to the reference structure for the deduplication domains; and selecting a deduplication domain for the new data chunk based on a number of hits to the reference structure indicating deduplication references.

This aspect of the method has the advantage of selecting a deduplication domain for a data chunk that most closely accommodates its deduplication relationships with other data chunks.

The staging area may be a staging storage controller serving input/output operations for a data chunk during the sampling period with no deduplication and the possible deduplication domains are each provided by a core storage controller having a deduplication database. The reference structure may be populated from the deduplication databases of each core storage controller. For each input/output operation hit to a reference in the reference structure for a data chunk, the data chunk may log which deduplication domain the reference in the reference structure was from.

The method may include migrating the data chunk to a core storage controller of the selected deduplication domain by remote copy and updating hosts to use the core storage controller copy.

According to another aspect there is provided a system for partitioning of deduplication domains in storage systems, comprising: a processor and a memory configured to provide computer program instructions to the processor to execute the function of the components: a data structure component for constructing a data structure having multiple nodes representing data chunks and edges between the nodes representing a weighting of deduplication references between the data chunks; a clustering component for performing clustering of the nodes of the data structure to split the nodes into clusters of tightly related nodes based on the weightings of the edges; and a migrating component for migrating the data chunks represented by a cluster of nodes to a deduplication domain to restrict deduplication to between only the data chunks in the deduplication domain.

The system may include: a controlling component for automatically deciding to split a storage domain according to resource requirements and controlling migration of the data chunks, wherein the controlling component has knowledge of the available resources of the storage system.

The system may include a merging component for: referencing a deduplication database for each deduplication domain, the deduplication database including references of data chunks in the deduplication domain, and merging two deduplication domains based on a similarity of the deduplication databases.

A deduplication domain may be allocated to a core storage controller and the core storage controller may include a deduplication database including references of data chunks in the deduplication domain.

The data structure component may include: adding a new node and a new edge when a new deduplication reference is created with a new data chunk; incrementing edge weightings when a new deduplication reference is created between existing data chunks; and decrementing edge weightings when a deduplication reference is removed between existing data chunks.

According to a further aspect of the present invention there is provided a system for partitioning of deduplication domains in storage systems, comprising: a processor and a memory configured to provide computer program instructions to the processor to execute the function of the components: a staging component for providing a staging area for new data chunks including a reference structure of possible deduplication domains into which a new data chunk may be migrated; a sampling component for carrying out a sampling period for a new data chunk to compare input/output operations for the new data chunk to the reference structure for the deduplication domains; and a domain selection component for selecting a deduplication domain for the new data chunk based on a number of hits to the reference structure indicating deduplication references.

The staging component may be a staging storage controller serving input/output operations for a data chunk during the sampling period in which no deduplication takes place, and the possible deduplication domains may each be provided by a core storage controller having a deduplication database and the reference structure is populated from the deduplication databases of each core storage controller.

The system may include a logging component for logging for a data chunk each input/output operation hit to a reference in the reference structure which deduplication domain the reference in the reference structure was from.

In one embodiment, the deduplication domains may be provided by core storage controllers in a cloud environment. Core storage controllers in a cloud environment may have no prior knowledge of a type of data chunk and therefore the described methods are advantageous to designate a data chunk appropriately for data deduplication.

According to a further aspect of the present invention there is provided a computer program product for partitioning of deduplication domains in storage systems, the computer program product comprising a computer readable storage medium having program instructions embodied therewith, the program instructions executable by a processor to cause the processor to: construct a data structure having multiple nodes representing data chunks and edges between the nodes representing a weighting of deduplication references between the data chunks; perform clustering of the nodes of the data structure to split the nodes into clusters of tightly related nodes based on the weightings of the edges; and migrate the data chunks represented by a cluster of nodes to a deduplication domain to restrict deduplication to between only the data chunks in the deduplication domain.

The program instructions may be executable by a processor to cause the processor to: provide a staging area for new data chunks including a reference structure of possible deduplication domains into which a new data chunk may be migrated; carry out a sampling period for a new data chunk to compare input/output operations for the new data chunk to the reference structure for the deduplication domains; and select a deduplication domain based on a number of hits to the reference structure indicating deduplication references.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method and system provide splitting of storage systems into optimally deduplicating subsets using clustering analysis algorithms. The method and system are described in the context of deduplication of storage volumes in a storage system such as a storage area network or cloud storage. However, the described method and system may be used for deduplication of other chunks of data.

Deduplication works by identifying repeating chunks of data in the data that are written to the storage system. A signature of each data chunk is calculated, for example, using a hash function, and the storage system checks if that signature is already present in a deduplication database. If a signature match is found, the data chunk is replaced by a reference to an already stored chunk, which reduces storage space that is required for storing the data. If no match is found, the data chunk is stored without modification and its signature is added to the deduplication database.

The described method includes constructing a data structure representing deduplication relationships between data chunks, such as volumes, and using the data structure to perform cluster analysis to find optimally deduplicating sets of data chunks. The data structure may be in the form of a graph data structure having nodes with interconnecting edges. Other non-graph forms of data structure may be used, which may be decomposable into a graph structure.

Tightly related data chunks identified by the cluster analysis may be migrated into separate deduplication domains dependent on the available hardware and resources. This may optimally migrate deduplicating subsets together into different Input/Output (IO) groups when a system is expanding and may optimize the deduplication hit rate in the IO groups that are available.

In an example embodiment, this may be applied to result in distinct deduplication domains provided by different storage controllers. The storage system may include multiple storage controllers each of which is designated for chunks of data based on their deduplication relationships providing optimized deduplication at each storage controller.

When a storage controller reaches resource limits, the cluster analysis of the deduplication relationships may be used to determine chunks of data that should be migrated to a new storage controller.

Figure 1A:
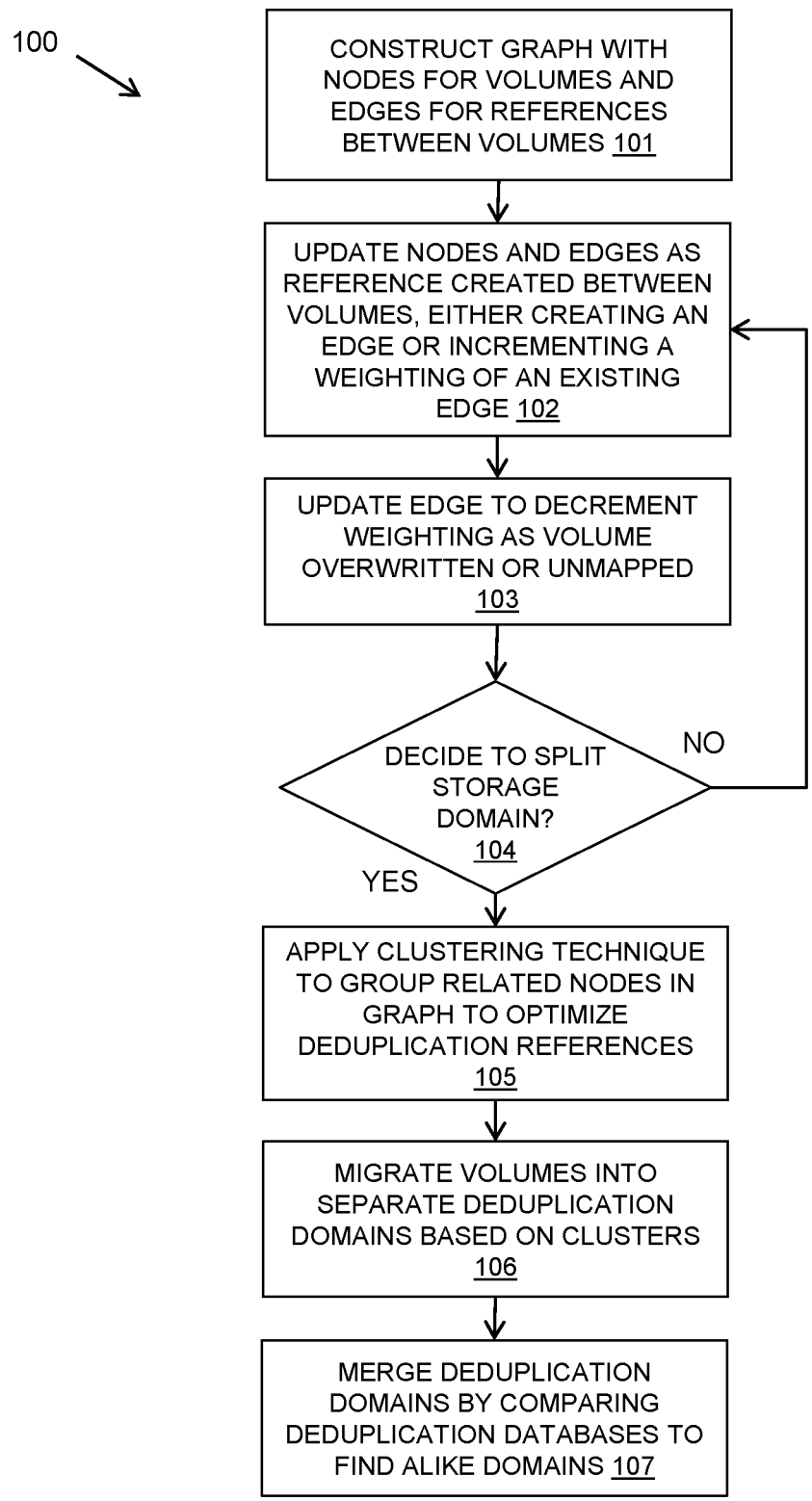
FIG. 1A is a flow diagram of an example embodiment of a first aspect of a method in accordance with the present invention.

Referring to FIG. 1A, a flow diagram 100 shows an example embodiment of an aspect of the described method. The method may be carried out at a storage system or other storage appliance in which deduplication of storage data chunks, such as volumes, is carried out. The method may be carried out by a storage controller system that has knowledge of storage controllers and resources within the storage system.

A graph data structure is constructed 101 representing deduplication relationships between data chunks. In this example embodiment, the data chunks are volumes and in a deduplicating storage system, references are created between volumes. Volumes in the graph are the nodes and any deduplication relationships between volumes become the edges, which are weighted by the count of deduplication relationships between volumes. In another implementation, the nodes in the graph data structure may represent other granularities of data chunks for which deduplication is carried out.

When a reference is created, the graph data structure is updated 102 to indicate that a reference exists between these two volumes. This may create a new node for a volume and create an edge for the reference or, if the edge exists between existing nodes representing the volumes, the weight of the edge is incremented. If an overwrite or an unmap is performed, the edge for the relationship between nodes for the volumes is updated 103 to decrement its weight.

A graph data structure may be constructed and maintained to present a representation of the deduplicated data chunks in a storage system. The storage system may be provided by distributed system resources including resource hardware that can be reconfigured by extending or reducing the hardware resources. Once a graph data structure is constructed, when it becomes necessary to increase the size of the storage systems, the graph data structure may be used to split data storage according to optimized deduplication domains.

It may be determined 104 at a certain time that the storage domain should be divided. For example, any action that results in the addition of a new storage controller due to low resources on an existing storage controller may result in such a trigger. There are various different reasons as to why this may occur. In one case, the system resource use may have naturally led to additional hardware being required. In another case, it may be observed that the deduplication database has exhausted available memory and as a result, is missing out on deduplications. When it is decided to split a storage domain, the goal is to optimize the amount of deduplication references in such a system.

The method may apply 105 a clustering technique to group related nodes in the graph data structure by identifying tightly related volumes. The clustering is carried out in a way that a minimum number of references are dropped, which in turn results in fewer deduplications being lost, post-split. The goal may be to partition based on input/output operations per second or storage capacity belonging to each cluster such that the distribution is optimized.

Various different graph clustering approaches may be used for weighted graphs. These include: minimal cut approaches including using the Stoer-Wagner algorithm; and thresholding and normalization based-approaches to leverage of highly-connected subgraph detection. This can be used to identify data chunks which are tightly related.

The graph may be a considered as a community structure with the nodes grouped into sets of nodes such that each set of nodes is densely connected internally. Therefore, the method includes constructing the graph from the inter-volume relationships, running community detection on the graph to identify distinct clusters and then moving those communities to separate storage controllers based on available resources.

Once these tightly related volumes are identified, a subset of the volumes may be migrated 106 into a separate deduplication domain dependent on the available hardware and resources, such as a new storage controller.

The migration may be controlled by a controlling system that has knowledge of the available resources such as storage controllers. For example, the controlling system may be a staging controller as described further below or a cloud storage provisioning controller in the case of a cloud storage system.

The subset of volumes that is to be migrated to a new deduplication domain on a new storage controller may be migrated via remote copy mechanisms, and any hosts are updated with the new locations of the volumes.

Deduplication domains may also be merged 107 from a plurality of storage controllers by comparing the deduplication databases for matches. This may be used for selecting two storage controllers to merge into a single deduplication domain.

Merging domains may be considered if it is apparent that certain deduplicating systems are being under-utilized, for example, if a storage controller does not have enough utilization, optimal domains may be merged together from a given controller to other controllers to allow the owners to turn off the under-utilized controller and make power savings.

To compare how well two storage controllers merge against one another a comparison controller may be compared to a candidate controller to merge against. The number of entries that exist in each table of their deduplication databases may be noted and. compared to another candidate controller to merge against. A candidate controller with the most common deduplication references with the comparison controller will offer the most deduplication candidates. Volumes may then be migrated to that controller, resulting in more deduplications versus a naïve merge.

Attempts to merge deduplication domains may be carried out at certain times or when less resources are required and therefore fewer domains.

Figure 1B:
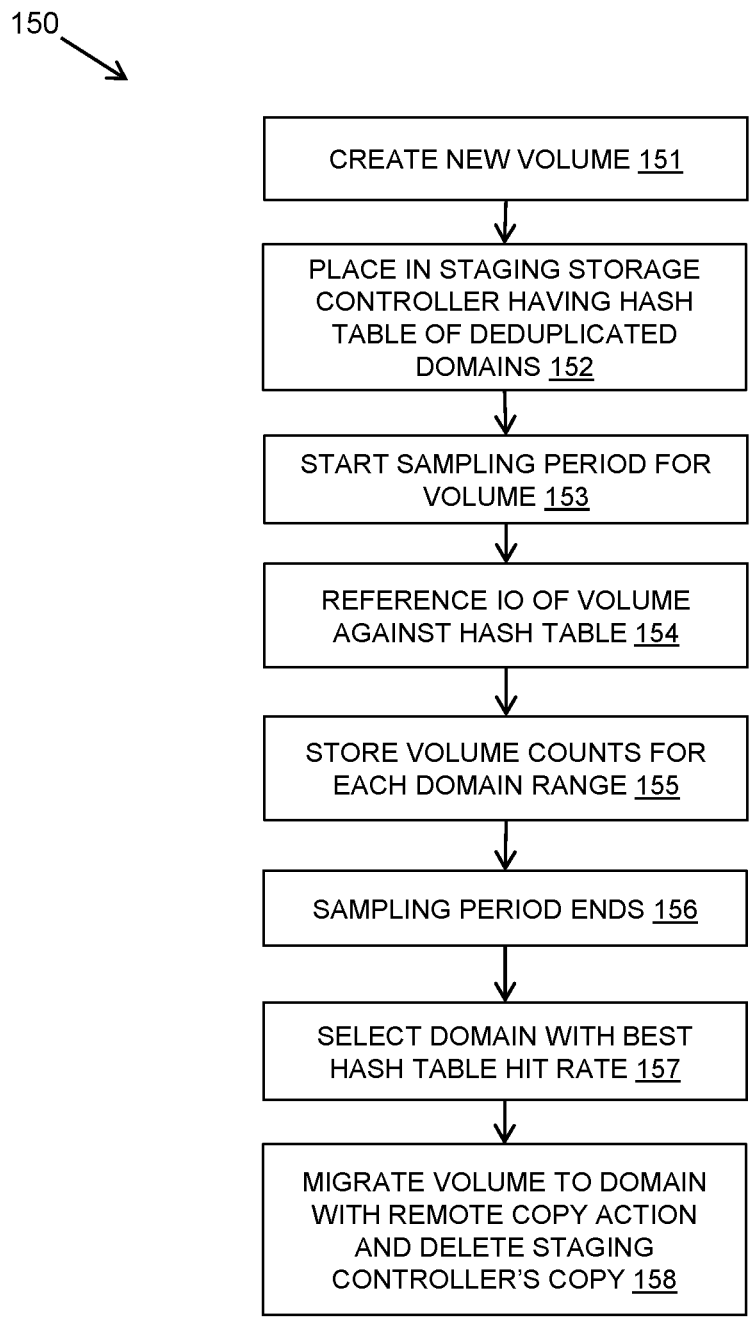
FIG. 1B is a flow diagram of an example embodiment of a second aspect of a method in accordance with the present invention.

Referring to FIG. 1B, a flow diagram 150 shows an example embodiment of another aspect of the described method. In one embodiment, this method may be applied in a storage environment with a plurality of available core storage controllers having multiple, distinct deduplication domains into which a new data chunk, such as a volume, may be placed. One example implementation is a cloud storage environment having multiple storage controllers that may provide distinct deduplication domains.

A new volume may be created 151 and placed 152 in a staging storage controller during a sampling period to determine the volume's deduplication behavior. This staging storage controller may have a reference structure, such as a hash table, referencing the storage in the deduplication domains. The staging storage controller serves input/output operations for a data chunk during a sampling period during which no deduplication takes place. The possible deduplication domains are each provided by a core storage controller having a deduplication database and the reference structure of the staging storage controller is populated from the deduplication databases of each core storage controller.

The reference structure may be populated with equal-sized ranges belonging to each core deduplication domain. A cryptographic hash function gives more-or-less random values for the data buffers it is given. They should be uniformly distributed over the range of possible sums. If there are two storage controllers, and the top half of the table is selected to come from one core storage controller, and the bottom half to come from a second core storage controller, it remains fair to distribute memory in this fashion as one expects half of the hits to go to the top half of the range, the other half to the bottom.

This means that the same hash table structure may be used in the staging storage controller as is used in the core deduplicating storage controllers. It is equally valid to have the entire hash table of each deduplicating storage controller stored on the staging storage controller for the purpose of sampling.

A sampling period may start 153 for a new volume and the IOs may be serviced from the staging storage controller. When an JO is performed against the volume, hashes are taken and these are referenced 154 against the reference structure. For example, the IOs of the new volume may be compared against hash table fragments for the different domains and the write-hit counts may be logged. The volume stores 155 the counts observed against each range belonging to a deduplication domain. During this period no deduplications are attempted.

At the end 156 of a sampling period, for example, an elapsed time or amount of IOs having occurred, the domain with the highest hit rate is selected 157 for the volume as its workload has most affinity to this domain. The volume is migrated 158 to the deduplication domain. The staging storage controller uses remote copy features to migrate the volume to the selected core storage controller. Hosts are updated to use the selected core storage controller's copy and the staging controller's copy is deleted. This technique optimizes storage usage by making better use of deduplication lookup table memory.

If this method were not implemented and a naive allocation scheme were to be used that round-robins assignment of storage controller to incoming volumes, there would be a fairly consistent mixture of deduplication opportunities across all controllers. For example, all storage controllers may have the key kernel files, or operating system files, because many different controllers have these files, deduplication lookup space is wasted compared to having only one controller handle those volumes.

In a cloud environment, it may not be possible to know what type of volume is being provisioned as there is no prior knowledge that a customer has to provide. By having the distinct deduplication domains on each controller and a means to determine what controller is most suitable for a given volume, an automatic mechanism is provided to select the best controller.

The staging controller is periodically updated to keep its reference structure relevant. The staging storage controller may keep its reference structure populated from the slices of the hash tables of the underlying core storage controllers. The core storage controller hash tables are populated as per standard in a deduplicating storage controller. The staging storage controller notes which ranges came from which core storage controller.

Figure 2:
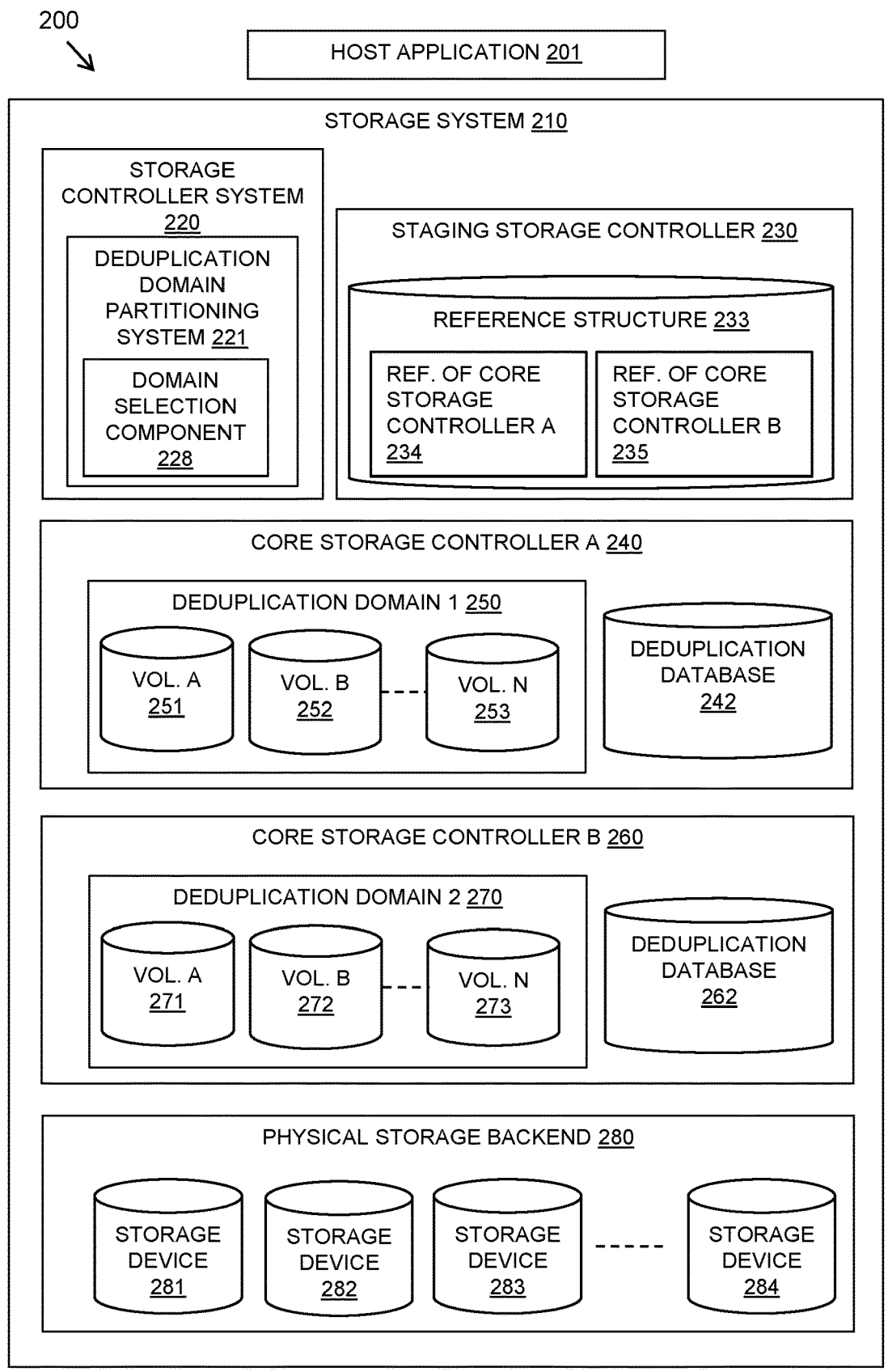
FIG. 2 is a block diagram of an example embodiment of a storage system in which the present invention may be implemented.

Referring to FIG. 2, a block diagram 200 shows an example embodiment of a storage system 210 in which the described method and system may be implemented.

The storage system 210 provides storage for host applications 201 at one or more host servers having storage interfaces through which IO operations are handled for writing and reading data to and from the storage system 210.

The storage system 210 includes one or more core storage system controllers 240, 260 and a physical storage backend 280. The physical storage backend 280 provides physical disk storage across an array of physical devices 281-284 of non-volatile storage media. The physical storage backend 280 has physical addresses at which logical units of host data are stored and referenced by logical block addresses (LBAs) in block virtualization components of the storage system controllers 240, 260.

A storage system controller 240, 260 may maintain a virtual domain in which logical metadata of LBAs is mapped to references of physical addresses at which the host data is stored at a physical storage backend 280. A storage pool may be allocated at the storage system controller 240, 260 for a host application 201. Data deduplication may operate across multiple storage controllers 240, 260.

In accordance with the described system, a core storage controller 240, 260 may provide a deduplication domain 250, 270 in which deduplication volumes 251-253, 271-273 may be allocated.

In the illustrated example, core storage controller A 240 provides a first deduplication domain 250 in which Volume A 251, Volume B 252, up to Volume N 253 are allocated and which may deduplicate between each other with a deduplication database 242 providing references to the deduplicating volumes.

Core storage controller B 260 provides a second deduplication domain 270 in which Volume A 2751, Volume B 272, up to Volume N 273 are allocated and which may deduplicate between each other with a deduplication database 262 providing references to the deduplicating volumes.

The described system includes a storage controller system 220 that has knowledge of the resources of the storage system 210 and includes a deduplication domain partitioning system 221 for optimal partitioning the deduplication domains based on clustering of a data structure representing deduplication relationships between volumes.

Another aspect provides a domain selection component 228 for selecting an appropriate deduplication domain for a new volume and this aspect includes a staging storage controller 230 used for a sampling period for a new volume and includes a reference structure 233 populated by references 234, 235 of the candidate core storage controllers for the new volume.

The storage controller system 220 may be integrated in the staging storage controller 230 or may be a separate system, such as a cloud storage provisioning controller in the case of a cloud storage system.

Figure 3:
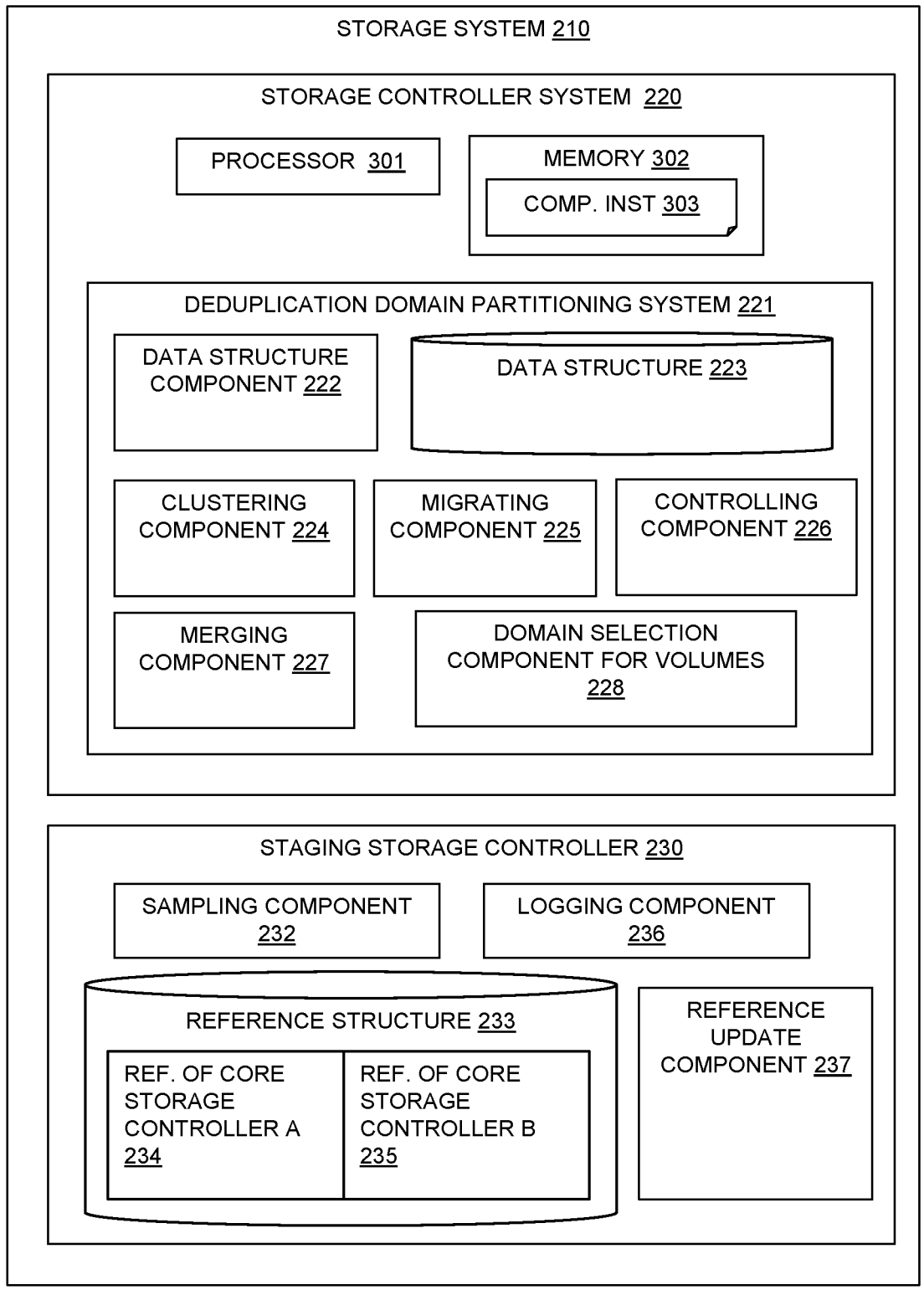
FIG. 3 is block diagram of an example embodiment of a system in accordance with the present invention.

Referring to FIG. 3, a block diagram shows an example embodiment of a storage system 210 having a storage controller 220 in which the described method may be implemented.

The storage controller system 220 includes at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The storage controller system 220 includes a deduplication domain partitioning system 221 including a data structure component 222 for constructing a data structure 223 having multiple nodes representing data chunks such as volumes and edges between the nodes representing a weighting of deduplication references between the data chunks and a clustering component 224 for performing clustering of the nodes of the data structure to split the nodes into clusters of tightly related nodes based on the weightings of the edges.

The deduplication domain partitioning system 221 includes a migrating component 225 for migrating the data chunks represented by a cluster of nodes to a deduplication domain to restrict deduplication to between only the data chunks in the deduplication domain.

The deduplication domain partitioning system 221 includes a controlling component 226 for automatically deciding to split a storage domain according to resource requirements and controlling migration of the data chunks, wherein the controlling component has knowledge of the available resources of the storage system.

The deduplication domain partitioning system 221 may also include a merging component 227 for referencing a deduplication database for each deduplication domain, the deduplication database including references of data chunks in the deduplication domain, and merging two deduplication domains based on a similarity of the deduplication databases.

A deduplication domain may be allocated to a core storage controller with the core storage controller including a deduplication database including references of data chunks in the deduplication domain.

The deduplication domain partitioning system 221 may include a domain selection component 228 for new data chunks such as volumes that uses a staging storage controller 230 to determine an optimal deduplication domain and therefore core storage controller for a new volume.

The staging storage controller 230 serves input/output operations for a data chunk during a sampling period during which there is no deduplication. The staging storage controller 230 may include a reference structure 233 of references possible deduplication domains into which a new data chunk may be migrated. In this example, the reference structure 233 includes references 234 of core storage controller A and references 235 of core storage controller B. The staging storage controller 230 may include a reference update component 237 to keep the reference structure 233 current with the core storage controller references.

A staging storage controller 230 may include a sampling component 232 for carrying out a sampling period for a new data chunk to compare input/output operations for the new data chunk to the reference structure for the deduplication domains and a logging component 236 for logging for a data chunk each input/output operation hit to a reference in the reference structure which deduplication domain the reference in the reference structure was from.

In one embodiment, the deduplication domains are provided by core storage controllers in a cloud environment.

Figure 4A:
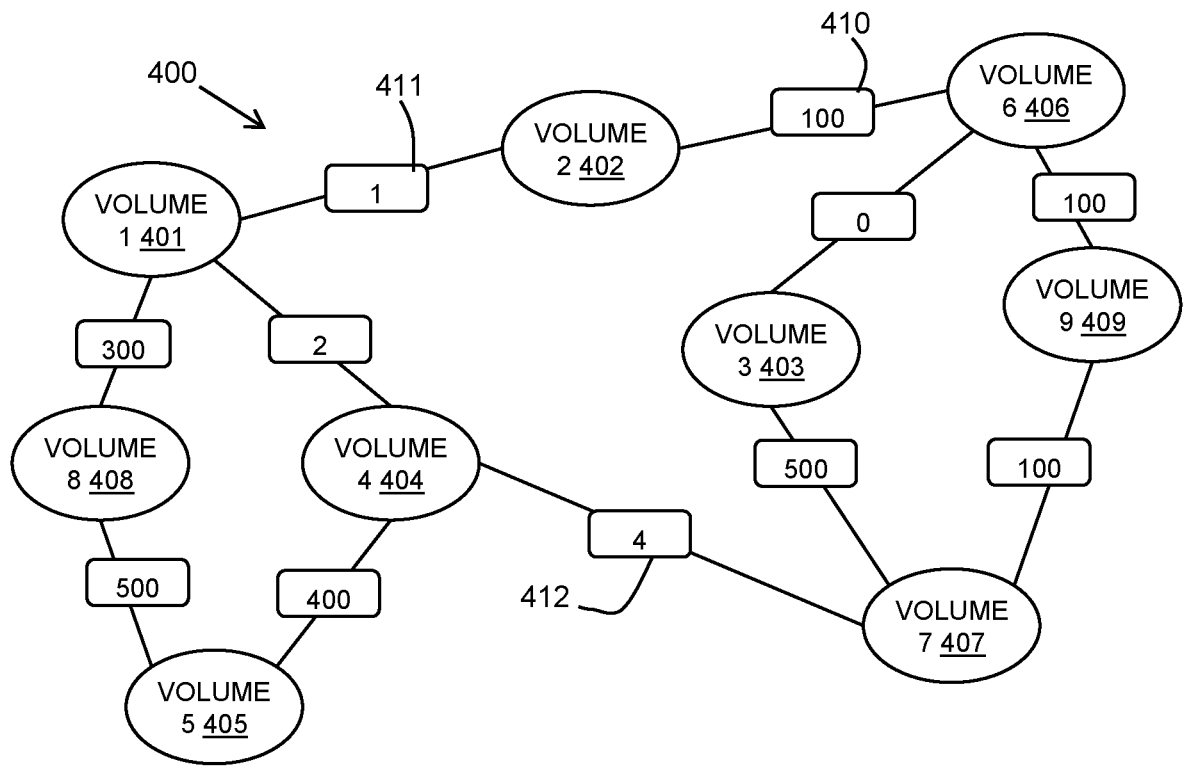
FIGS. 4A and 4B are schematic diagrams illustrating an example representation of a graph in accordance with an aspect of the present invention.
Figure 4B:
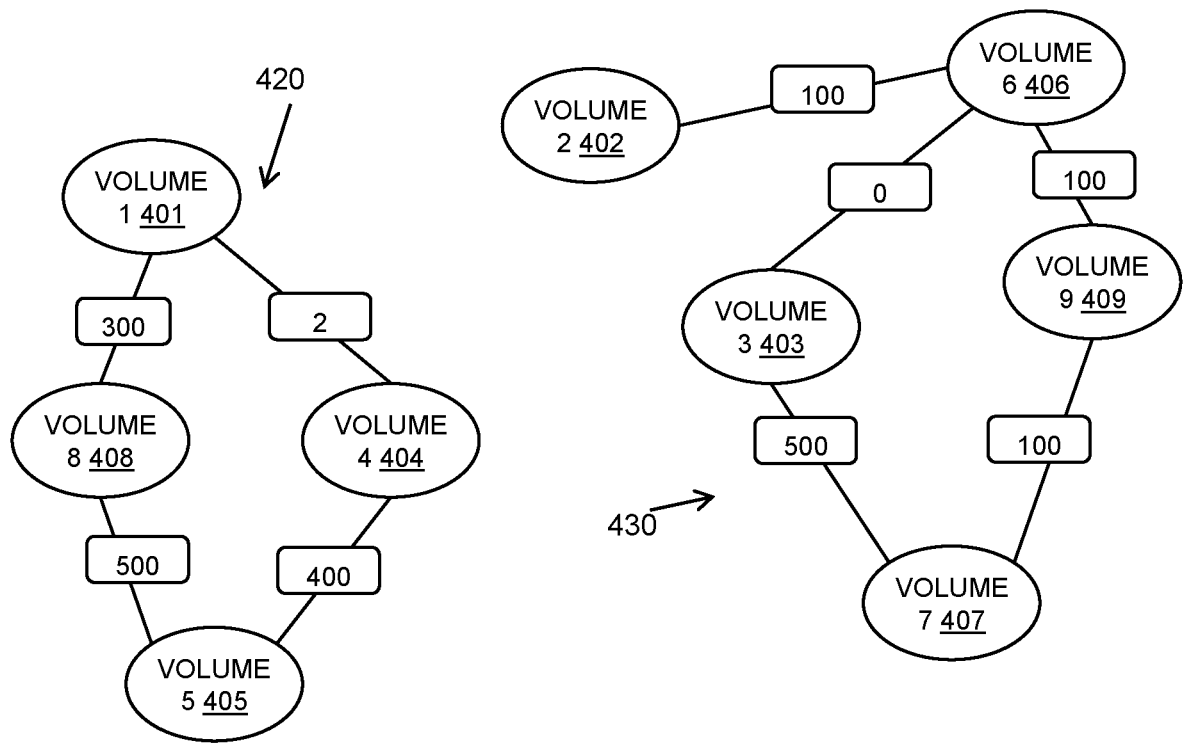

FIGS. 4A and 4B are schematic diagrams shows an example representation of a graph data structure 400 as constructed by the described method, such as that described in relation to FIG. 1A.

The graph data structure 400 shown in FIG. 4A has nodes representing the data chunks in the form of volumes 401-409 in a deduplicating storage system. Edges 410 between nodes represent deduplication references created between volumes. The edges 410 are weighted by the count of deduplication relationships between volumes 401-409.

When a reference is created between volumes 401-409, the graph data structure 400 is updated to indicate that a reference exists between these two volumes. This may create a new node for a volume and create an edge for the reference or, if the edge exists between existing nodes representing the volumes, the weight of the edge 410 is incremented. If an overwrite or an unmap is performed, the edge 410 for the relationship between nodes for the volumes is updated to decrement its weight.

FIG. 4B shows a clustering technique applied to the data structure 400 to group related nodes in the graph data structure by identifying tightly related volumes. The clustering is carried out in a way that a minimum number of references are dropped, which in turn results in fewer deduplications being lost, post-split. In the example shown, the low edge weights of "1" 411 between volume 1 401 and volume 2 402 and of "4" 412 between volume 4 404 and volume 7 407 are dropped, creating two clusters 420, 430. The volumes in a cluster 420, 430 may be migrated to a single deduplication domain.

Figure 5A:
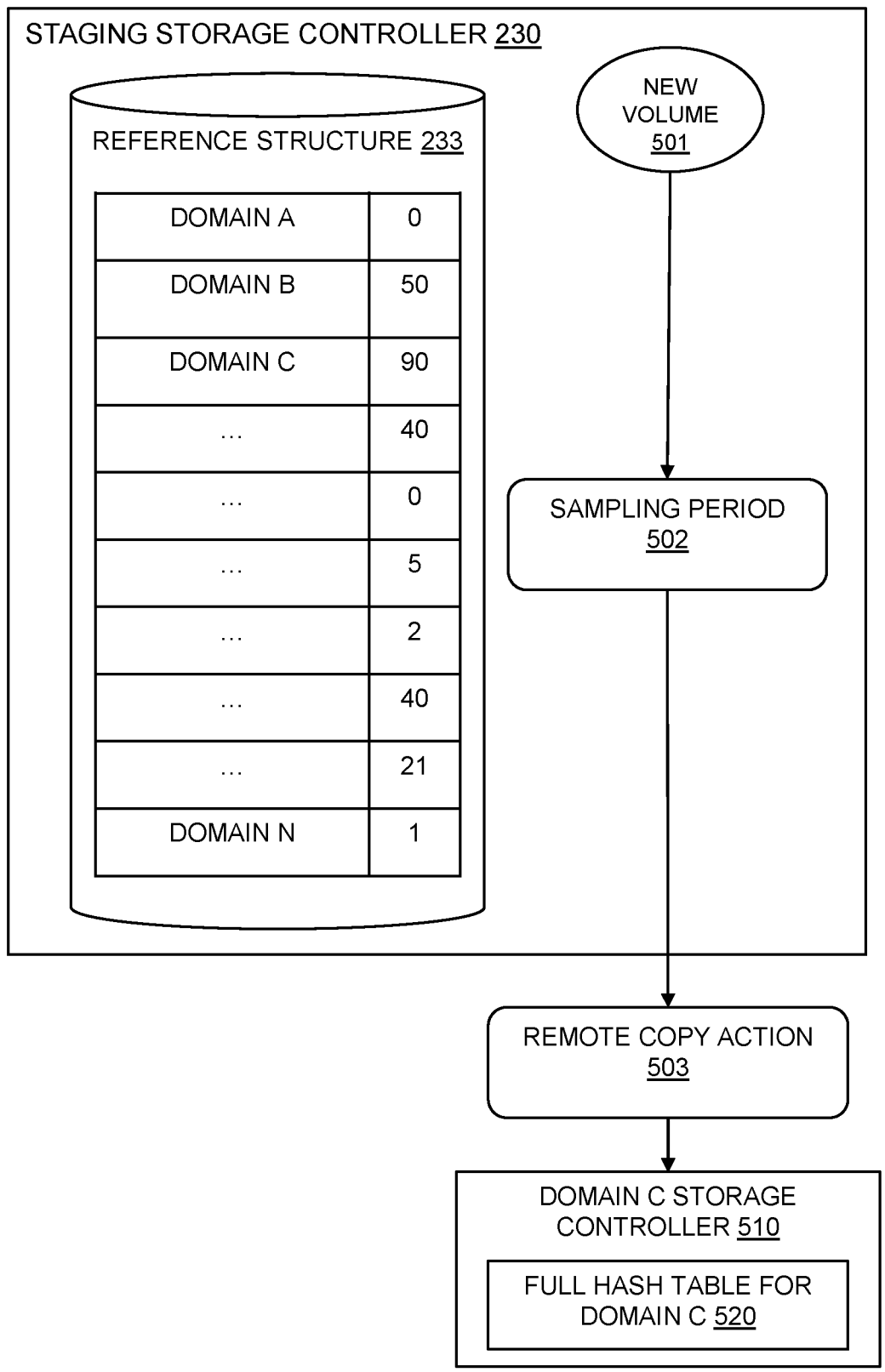
FIGS. 5A and 5B are schematic diagrams illustrating staging aspects in accordance with an aspect of the present invention.

Referring to FIG. 5A, a schematic diagram shows an example embodiment of a staging storage controller 230 for determining a deduplication domain for a new volume 501 as described in relation to FIG. 1B.

The staging storage controller 230 includes a reference structure 233 with ranges for each available deduplication domain. During a sampling period 502 for the new volume 501, when an IO is performed against the volume, hashes are taken and these are referenced against the reference structure 233. The volume stores the counts observed against each range belonging to a deduplication domain and at the end of the sampling period 502, the domain with the highest hit rate is selected for the volume as its workload has most affinity to this domain. In the example shown, domain C has 90 hits and so the storage controller 510 for domain C is selected.

The volume is migrated to the storage controller 510 of deduplication domain C by a remote copy action 503. The storage controller 510 has the full hash table for domain C 520. Hosts are updated to use the selected core storage controller's copy and the staging controller's copy is deleted.

Figure 5B:
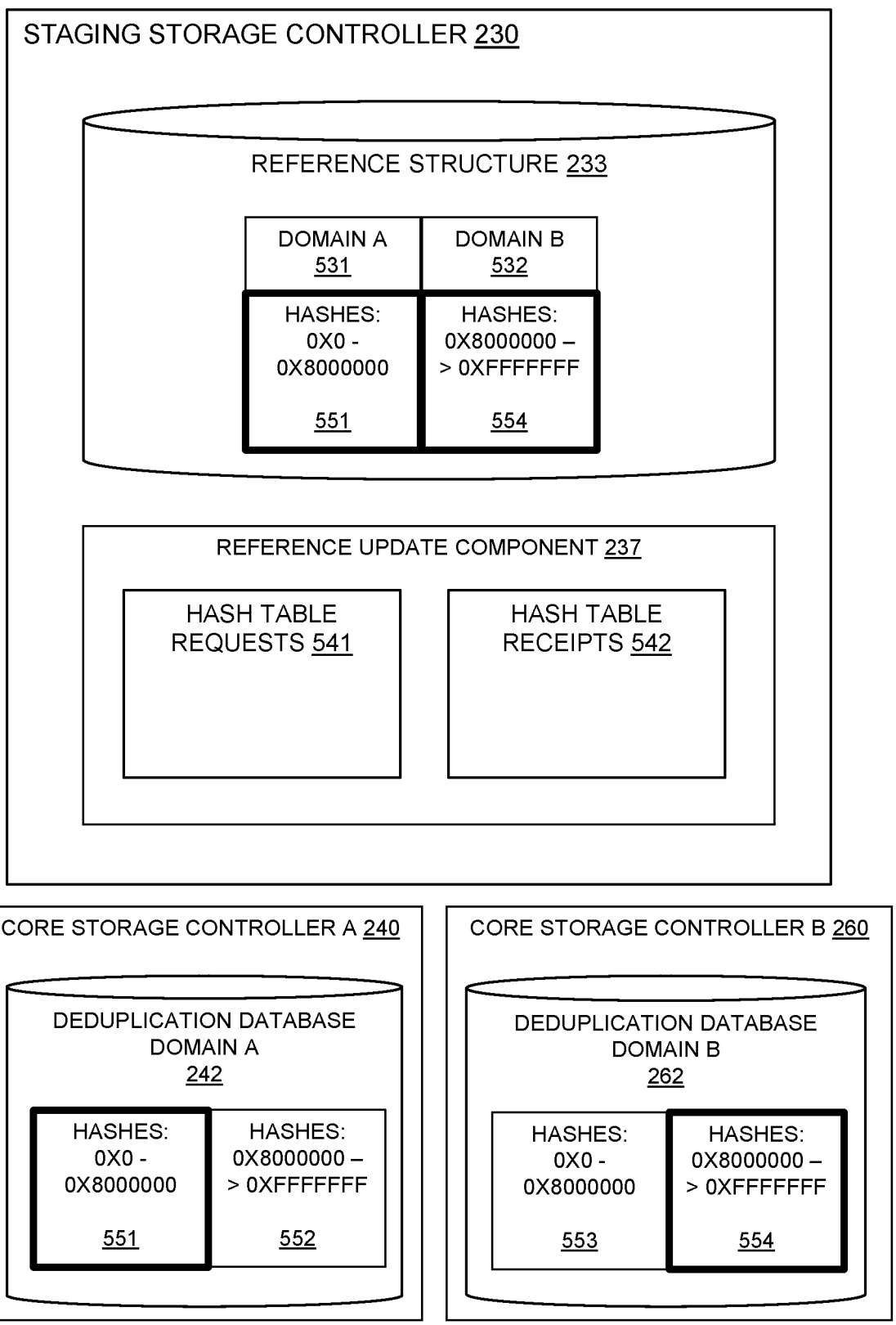

Referring to FIG. 5B, a schematic diagram illustrates an example embodiment of the updating of the reference structure 233 of the staging storage controller 230. The staging storage controller 230 keeps its reference structure 233 populated from slices of the hash tables of the underlying core storage controllers 240, 260. The staging storage controller 230 notes which ranges came from which core storage controller 240, 260.

In the simplified example of FIG. 5B, a core storage controller A 240 has a deduplication database for domain A 242, for example, including hashes 0x0 to >0xffffffff. Similarly, a core storage controller B 260 has a deduplication database 262 for domain B including hashes 0x0 to >0xffffffff. These hashes may be divided into two 551, 552 and 553, 554 and an upper half of hashes 0x0-0x8000000 551 attributed to core storage controller A 240 and a lower half 0x8000000->0xffffffff to core storage controller B 260.

A reference update component 237 of the staging storage controller 230 requests 541 hash table updates from the core storage controllers 240, 260 and receives 542 updates that are provided to the reference structure 233.

Figure 6:
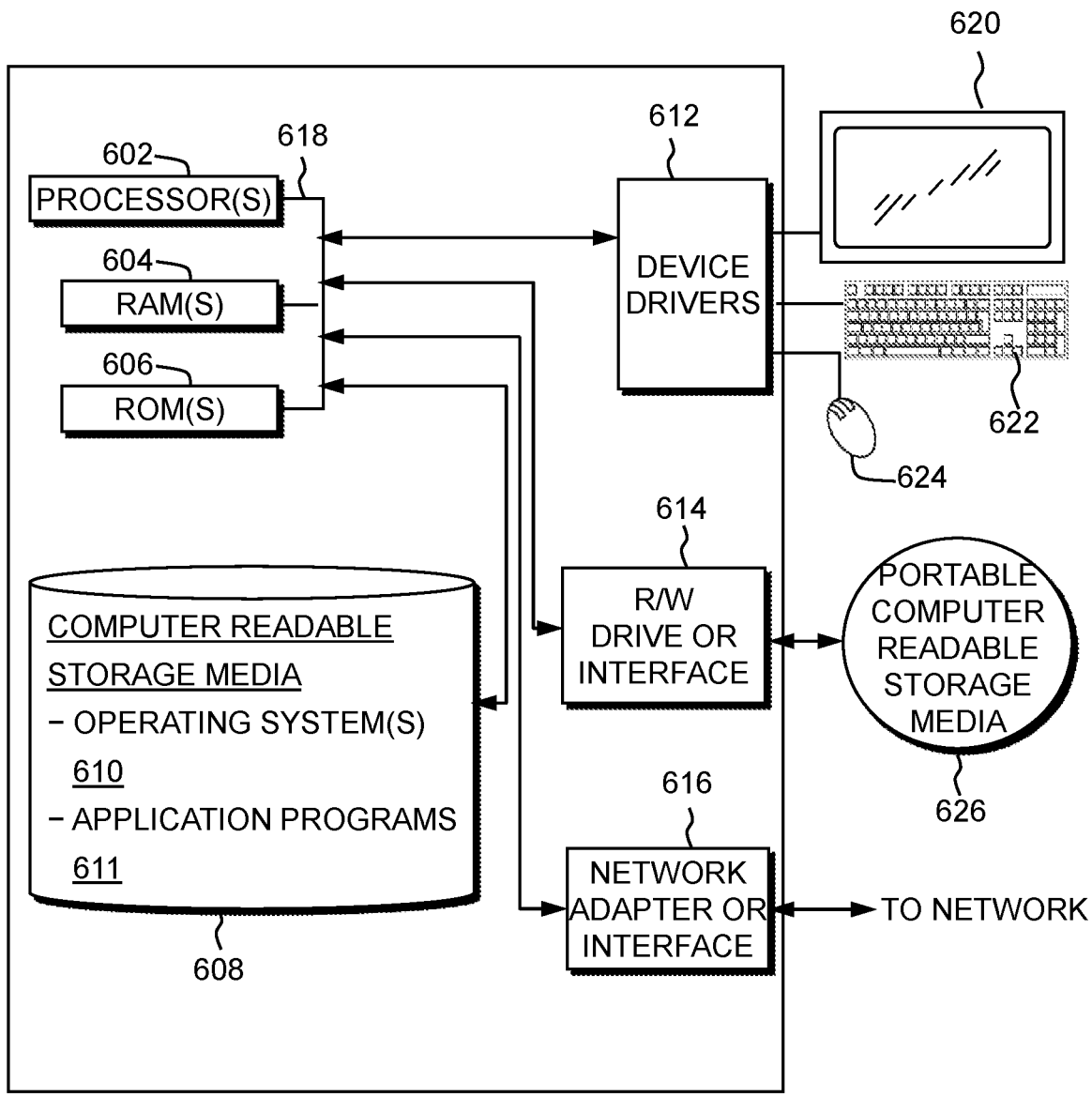
FIG. 6 is a block diagram of an embodiment of a computer system or cloud server in which the present invention may be implemented.

FIG. 6 depicts a block diagram of components of the computing system of the storage system 210 of FIG. 2, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the deduplication domain partitioning system 221 and staging storage controller 230, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system can also include a R/W drive or interface 614 to read from and write to one or more portable computer readable storage media 626. Application programs 611 on computing system can be stored on one or more of the portable computer readable storage media 626, read via the respective R/W drive or interface 614 and loaded into the respective computer readable storage media 608.

Computing system can also include a network adapter or interface 616, such as a TCP/IP adapter card or wireless communication adapter. Application programs 611 on computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

Computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
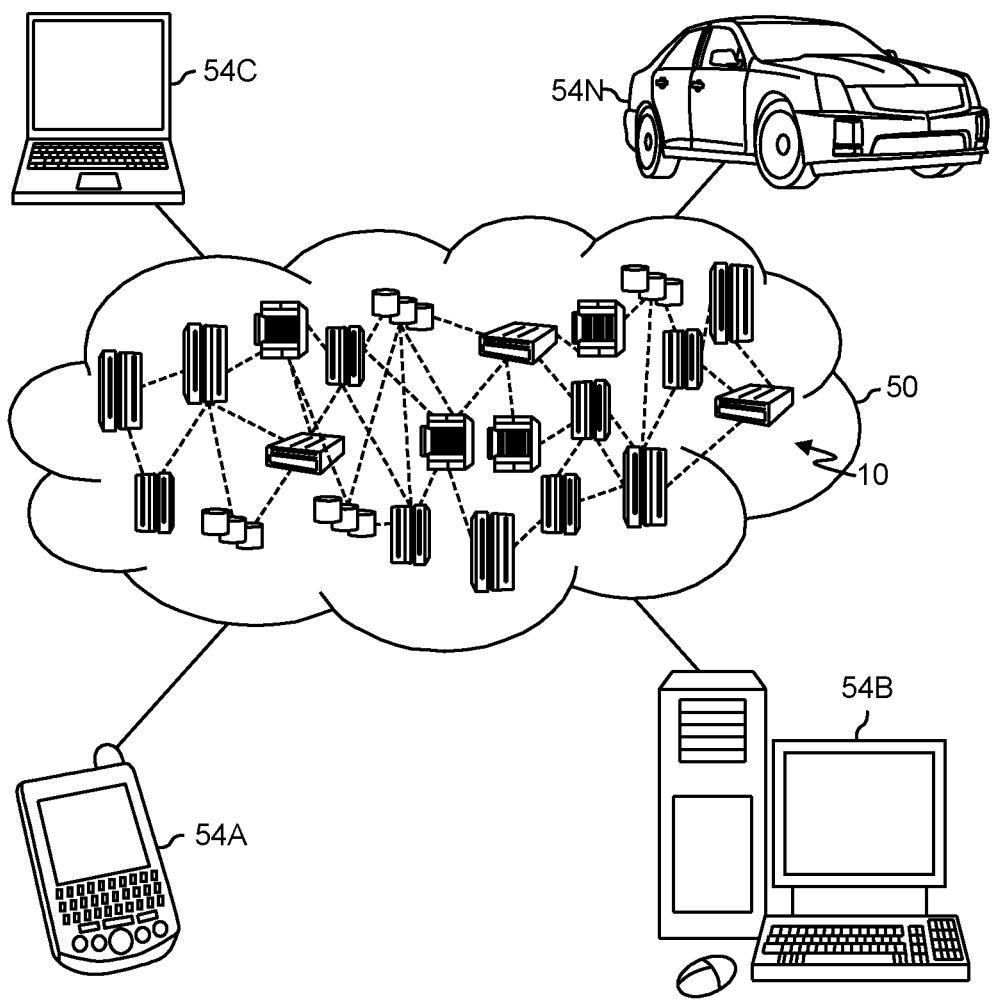
FIG. 7 is a schematic diagram of a cloud computing environment in which the present invention may be implemented.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
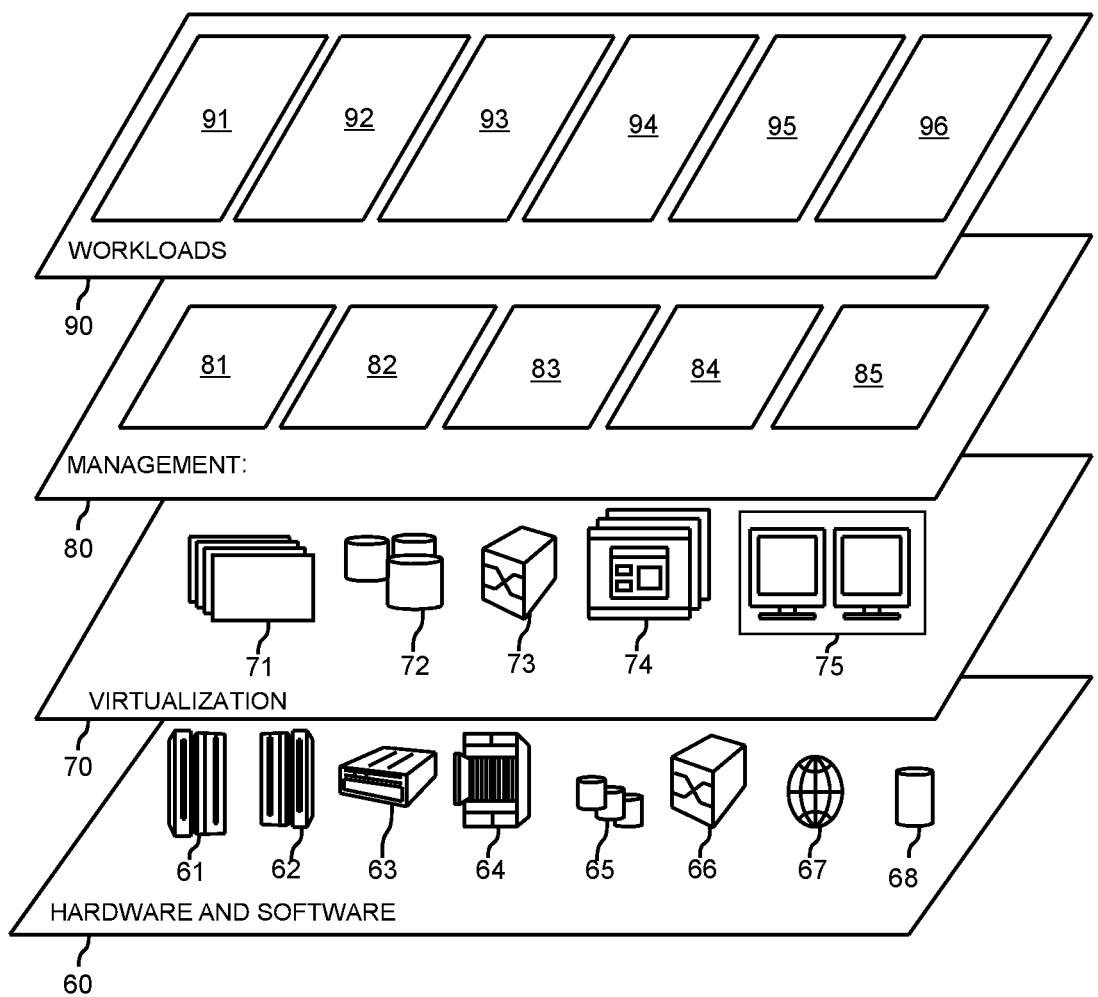
FIG. 8 is a diagram of abstraction model layers of a cloud computing environment in which the present invention may be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for partitioning of deduplication domains in a storage system, comprising:
constructing a data structure having multiple nodes representing data chunks and edges between the nodes representing a weighting of deduplication references between the data chunks, wherein constructing the data structure includes:
adding a new node and a new edge when a new deduplication reference is created with a new data chunk,
incrementing edge weightings when a new deduplication reference is created between existing data chunks, and
decrementing edge weightings when a deduplication reference is removed between existing data chunks; and
performing clustering of the nodes of the data structure to split the nodes into clusters of tightly related nodes based on the weightings of the edges; and
migrating the data chunks represented by a cluster of nodes to a deduplication domain to restrict deduplication to between only the data chunks in the deduplication domain.

2. The method as claimed in claim 1, wherein migrating the data chunks is controlled by a controlling system that has knowledge of available resources of the storage system.

3. The method as claimed in claim 1, including: splitting a storage domain in response to an addition of a new storage controller to the storage system due to low resources on an existing storage controller of the storage system.

4. The method as claimed in claim 1, including:
referencing a deduplication database for each deduplication domain, the deduplication database including references of data chunks in the deduplication domain; and
merging two deduplication domains based on a similarity of the deduplication databases.

5. The method as claimed in claim 1, wherein a deduplication domain is allocated to a core storage controller and the core storage controller includes a deduplication database including references of data chunks in the deduplication domain.

6. The method as claimed in claim 1, wherein the data structure is a graph data structure treated as a community structure.

7. The method as claimed in claim 1, wherein performing clustering of the nodes by clustering techniques includes identifying tightly related data chunks and dropping a minimum number of deduplication references.

8. The method as claimed in claim 1, including:
providing a staging area for new data chunks including a reference structure of possible deduplication domains into which a new data chunk may be migrated;
carrying out a sampling period for a new data chunk to compare input/output operations for the new data chunk to the reference structure for the deduplication domains; and
selecting a deduplication domain for the new data chunk based on a number of hits to the reference structure indicating deduplication references.

9. A computer-implemented method for partitioning of deduplication domains in storage systems, comprising:
providing a staging area for new data chunks including a reference structure of possible deduplication domains into which a new data chunk may be migrated;
carrying out a sampling period for a new data chunk to compare input/output operations for the new data chunk to the reference structure for the deduplication domains;

selecting a deduplication domain for the new data chunk based on a number of hits to the reference structure indicating deduplication references; and migrating the new data chunk to a core storage controller of the selected deduplication domain.

10. The method as claimed in claim 9, wherein the staging area is a staging storage controller serving input/output operations for a data chunk during the sampling period.

11. The method as claimed in claim 10, wherein the possible deduplication domains are each provided by an associated core storage controller having a deduplication database.

12. The method as claimed in claim 11, wherein the reference structure is populated from the deduplication database of each core storage controller.

13. The method as claimed in claim 9, wherein for each input/output operation hit to a reference in the reference structure for a data chunk, the data chunk or data logs which deduplication domain the reference in the reference structure was from.

14. The method as claimed in claim 9, wherein the new data chunk is migrated to the core storage controller of the selected deduplication domain by a remote copy, and comprising: updating hosts to use the core storage controller copy.

15. A system for partitioning of deduplication domains in storage systems, comprising:
a processor and a memory configured to provide computer program instructions to the processor to execute a function of the following components:
a data structure component for constructing a data structure having multiple nodes representing data chunks and edges between the nodes representing a weighting of deduplication references between the data chunks, wherein constructing the data structure includes:
incrementing edge weightings when a new deduplication reference is created between existing data chunks, and
decrementing edge weightings when a deduplication reference is removed between existing data chunks;
a clustering component for performing clustering of the nodes of the data structure to split the nodes into clusters of tightly related nodes based on the weightings of the edges; and
a migrating component for migrating the data chunks represented by a cluster of nodes to a deduplication domain to restrict deduplication to between only the data chunks in the deduplication domain.

16. The system as claimed in claim 15, including:
a controlling component for automatically deciding to split a storage domain according to resource requirements and controlling migration of the data chunks, wherein the controlling component has knowledge of available resources of the storage systems.

17. The system as claimed in claim 15, including a merging component for:
referencing a deduplication database for each deduplication domain, the deduplication database including references of data chunks in the deduplication domain, and
merging two deduplication domains based on a similarity of the deduplication databases.

18. The system as claimed in claim 15, wherein a deduplication domain is allocated to a core storage controller and the core storage controller includes a deduplication database including references of data chunks in the deduplication domain.

19. The system as claimed in claim 15, wherein the data structure component includes:
adding a new node and a new edge when a new deduplication reference is created with a new data chunk.

20. A system for partitioning of deduplication domains in storage systems, comprising:
a processor and a memory configured to provide computer program instructions to the processor to execute a function of the following components:
a staging component for providing a staging area for new data chunks including a reference structure of possible deduplication domains into which a new data chunk may be migrated;
a sampling component for carrying out a sampling period for a new data chunk to compare input/output operations for the new data chunk to the reference structure for the deduplication domains,
wherein no deduplications are attempted during the sampling period; and
a domain selection component for selecting a deduplication domain for the new data chunk based on a number of hits to the reference structure indicating deduplication references,
wherein the staging component is a staging storage controller serving input/output operations for a data chunk during the sampling period in which no deduplication takes place,
wherein the possible deduplication domains are each provided by an associated core storage controller having a deduplication database, and the reference structure is populated from the deduplication databases of the core storage controllers.

21. The system as claimed in claim 20, including a logging component for logging for a data chunk each input/output operation hit to a reference in the reference structure which deduplication domain the reference in the reference structure was from, wherein the reference structure is a hash table.

22. The system as claimed in claim 20, wherein the deduplication domains are provided by core storage controllers in a cloud environment.

23. A computer program product for partitioning of deduplication domains in storage systems, the computer program product comprising a computer readable storage medium having program instructions embodied therewith, the program instructions executable by a processor to cause the processor to:
construct a data structure having multiple nodes representing data chunks and edges between the nodes representing a weighting of deduplication references between the data chunks,
wherein edge weightings are adjusted in response to a new deduplication reference being created between existing data chunks,
wherein the data chunks are blocks of data;
perform clustering of the nodes of the data structure to split the nodes into clusters of tightly related nodes based on the weightings of the edges; and
migrate the data chunks represented by a cluster of nodes to a deduplication domain to restrict deduplication to between only the data chunks in the deduplication domain.

24. The computer program product as claimed in claim 23, wherein the program instructions are executable by a processor to cause the processor to:
- provide a staging area for new data chunks including a reference structure of possible deduplication domains into which a new data chunk may be migrated;
- carry out a sampling period for a new data chunk to compare input/output operations for the new data chunk to the reference structure for the deduplication domains,
- wherein no deduplications are attempted during the sampling period; and
- select a deduplication domain based on a number of hits to the reference structure indicating deduplication references.

25. The computer program product as claimed in claim 23, wherein constructing the data structure includes: adding a new node and a new edge when a new deduplication reference is created with a new data chunk.

* * * * *